Patented Dec. 10, 1940

2,224,329

UNITED STATES PATENT OFFICE 2,224,329

COLOR PHOTOGRAPHY

Gustav Wilmanns, Wolfen, Kreis Bitterfeld, Wilhelm Schneider, Dessau, and Gerhard von Kujawa, Leipzig, Germany, assignors, by mesne assignments, to General Aniline & Film Corporation, New York, N. Y., a corporation of Delaware No Drawing. Application October 28, 1937, Serial No. 171,478. In Germany October 31, 1936

1 Claim. (Cl. 95—2)

The present invention relates to color photography and more particularly to a process of reproducing colored pictures from colored negatives.

In the known production of photographic and cinematographic multi-color pictures by the negative-positive process there is first obtained a negative in color complementary to that of the object photographed and a color positive is then obtained by copying. By this process, however, it is very difficult to attain correct color reproduction.

It is an object of the invention to avoid or minimize these difficulties. A further object is the provision of a process by which positives in correct natural colors may be easily obtained. Further objects will be apparent from the following detailed specification.

According to this invention a color negative is produced, the color of which deviates from the color complementary to that of the object photographed and by suitable choice of copying conditions produces from this negative a copy in correct color. There is obtained by this process, therefore, an exposure which in respect of the distribution of the lights and shadows is negative but of color tints different from the complementary color. Preferably the exposure material or the treatment of this material leading to the color picture is so selected that a negative is obtained the colors of which correspond at least approximately to those of the object photographed. With such a negative it is much easier to determine to what degree the production of the color is correct and what copying conditions must be selected for securing a correct color copy.

For producing such a negative a photographic material is used which has sensitive emulsions that are spectrally different, the emulsions either being arranged in several superimposed layers on one or both sides of a carrier or applied to a carrier in the form of fine particles. The emulsions are sensitized in known manner with suitable sensitizers. Filters may be provided in known manner as separate layers or by imbibition in the respective emulsion layers.

After the exposure the color separations are produced in the several emulsion layers by conversion into dyestuff images in known manner. The manner of production of the dyestuff image varies somewhat and depends upon what kind of photographic material is used. When emulsion layers containing the several dyestuff components, particularly dyestuff components fast to diffusion, are used, colored images may be produced by color forming development, using a suitable developer. In this case there are available the layers prescribed in U. S. Patent applications Ser. No. 72,718 filed April 4, 1936; Ser. No. 90,726 filed July 15, 1936; Ser. No. 94,340 filed August 5, 1936; Ser. No. 158,860 filed August 13, 1937; Ser. No. 159,518 filed August 17, 1937; and the U. S. Patent applications Ser. No. 164,499 filed September 18, 1937, and Ser. No. 166,832 filed October 1, 1937.

There may also be used layers prescribed in U. S. Patent application Ser. No. 10,704 with azo-dyestuff components which are converted into azo-dyestuffs by diazotization and coupling. If the layers prescribed in U. S. Patent application Ser. No. 111,250 filed November 17, 1936, are used after the exposure the dyestuff former or the color former is destroyed directly or indirectly above the silver image, for example by the known silver bleaching-out process. The color image may alternatively be produced by some other known method, for example by mordant dyeing or residual image development.

If desired layers can be combined together in which the color images are produced by different methods. When using layers with dyestuff formers one has the choice of color of the negative so far in hand that different dyestuff components may be added to the differently sensitized layers. Obviously in this case the general conditions must be those for subtractive color reproduction. For the hitherto known production of a complementary color image the following arrangement of layers may be selected: In contact with the carrier is a red-sensitive layer having a blue-green component; on this there is a green-sensitive layer having a purple component and on this again a blue-sensitive layer having a yellow component. If desired filter layers may be arranged between the several layers. In this arrangement each layer is sensitive to that color of the light which is complementary to the color produced by the development. If one deviates from this relationship between sensitization and the developed color there is obtained, according to the present invention, a negative of which the colors are different from those complementary to the color of the object photographed. The principle of subtractive color reproduction necessitates that in this invention the dyestuffs to be used as the color components must allow to pass a more or less smaller region of the spectrum than has been necessary hitherto in the procedure for obtaining a negative in complementary colors.

A negative which shows the object photographed in correct or approximately correct colors is obtained, for example, on a material in which the red-sensitive layer is in contact with the carrier and contains a red component; over this there is cast a green-sensitive layer having a green component and this layer is covered by a blue-sensitive layer having a blue component. With the negative thus obtained it is at once possible to judge the correctness of the color and select the copying conditions for example the copying light, regard being had, of course, to the properties of the copying material. The same material may be used for copying as that for exposure, or, the copying conditions being suitably changed, there may be used a material the sensitivity of the layers of which stand in another relationship to the color obtained from the dyestuff component.

In copying a negative all the expedients known for producing subtractive copies may be used, for example as described in U. S. Patent application Ser. No. 94,341 filed August 5, 1936, a copying light may be used in which the rays of wave-length of about 6600–7200 A. U. are lacking. Furthermore it is advantageous as described in U. S. Patent application Ser. No. 126,256 filed February 17, 1937, to expose to light of narrowly limited range of wave-length in some cases either one or other of the spectral components of the copying light being simultaneously or successively strengthened or weakened. So also it may be an advantage as described in U. S. Patent application Ser. No. 139,481 filed April 28, 1937 to arrange over the emulsion layer of the copying material an ultra-violet light filter.

The following examples serve to illustrate the invention:

1. For exposure there is used a multi-layer material, the layers of which are arranged as follows: Onto the support there is cast a red-sensitive layer containing as a dyestuff component 1-(3'-sulfophenyl) - 3 - (4''-stearylaminophenyl)-5-pyrazolone in the form of the sodium salt. By color forming development this dyestuff component yields a purple picture. Onto this layer there is cast a green-sensitive layer containing as a dyestuff component the sodium salt of 1-N-stearyl-4-N(1'-hydroxy-2'-naphthoyl)-phenylene diamine sulfonic acid, which yields a blue-green picture. As the top layer there is used an emulsion not specially sensitized containing as a dyestuff component for the yellow picture the sodium salt of p-stearylaminobenzoyl-acetanilide-p'-carboxylic acid. After the exposure the material is as usual developed to yield a colored picture by means of p-dimethylamino-aniline and the negative thus obtained is copied on a color photographic material of the following composition:

Onto the carrier there is cast a red-sensitive layer containing a dyestuff component for the purple picture. On top of this layer there is arranged a green-sensitive layer containing a dyestuff component fast to diffusion for the blue-green picture. The top layer is not specially sensitized and contains a dyestuff component fast to diffusion for the yellow picture. As dyestuff components the same compounds may be used as with the negative material.

2. For exposure there is used a material of the following composition:

Onto the carrier there is cast a green-sensitive layer containing a dyestuff component for the blue-green picture. On top of this there is arranged a red-sensitive layer containing a dyestuff component for the yellow picture and on top of this latter there is cast a layer not specially sensitized and containing a dyestuff component for the purple picture. After the color forming development this negative is printed onto the following material:

A red-sensitive emulsion containing a dyestuff component for the purple picture serves as the undermost layer. Onto this there is cast a green-sensitive layer containing a dyestuff component for yellow and on top of this there is arranged a blue-sensitive layer containing a dyestuff component for blue-green.

3. For exposure there is used a material having the following arrangement of layers:

Onto the carrier there is cast a green-sensitive layer containing a dyestuff component for the blue-green picture, onto which there is cast a red-sensitive layer containing a color component for the yellow picture and on top of this a layer not specially sensitized containing a dyestuff component for the purple picture. As a printing material a multi-layer material of the following composition is used:

Onto the carrier there is cast a green-sensitive layer containing a dyestuff component for the yellow picture and onto this latter a red-sensitive layer containing a dyestuff component for the purple picture. As a top layer there is used a blue-sensitive layer containing a dyestuff component for blue-green.

In the Examples 2 and 3, the following compounds may be used as dyestuff components:

As dyestuff component for yellow: The sodium salt of m-stearylaminobenzoyl-acetanilide-p'-carboxylic acid;

as dyestuff component for purple: 1-(3'-sulfophenyl)-(4''-stearylaminophenyl)-5-pyrazolone;

as dyestuff component for blue-green: The sodium salt of 1-N-stearyl-4-N-(1-hydroxy-2'-naphthoyl)-phenylenediamine sulfonic acid.

It follows from the examples given that for obtaining a print with correct color values by means of a negative material there exists a great variety of possibilities of procedure. It is not necessary for the negative to yield a complementary colored picture in correct color values, but it is possible by varying the sensitization and the dyestuff components of the particular layers to use a great variety of materials for the printing process. It should not be difficult for anyone skilled in the art to find further possibilities of combination for the examples above given and to exclude those which do not yield a print in correct color values if the laws of subtractive color photography are observed.

What we claim is:

A process of producing photographic and cinematographic multi-color pictures, which comprises producing a colored negative on a multi-layer material, each layer of which being differently light-sensitive and containing a color former fast to diffusion, said color formers being so selected that each layer after development is subtractively colored in a color which transmits the light to which the layer is sensitive and permits the passage of a narrower region of the spectrum than that transmitted by a layer colored by ordinary complementary coloring, printing a multi-color print from said negative directly onto a photographic multi-layer material containing color formers fast to diffusion while so adjusting the copying light to the color formers selected that the positive colors obtainable in said multi-layer material correspond exactly with those of the object to be reproduced.

GUSTAV WILMANNS.
WILHELM SCHNEIDER.
GERHARD v. KUJAWA.